(12) United States Patent
Trajkovic et al.

(10) Patent No.: US 10,977,514 B2
(45) Date of Patent: Apr. 13, 2021

(54) METHOD AND APPARATUS FOR VERIFICATION OF AN AUTHENTICATION SYMBOL

(71) Applicant: Zebra Technologies Corporation, Lincolnshire, IL (US)

(72) Inventors: Miroslav Trajkovic, Setauket, NY (US); Heng Zhang, East Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 148 days.

(21) Appl. No.: 16/193,820

(22) Filed: Nov. 16, 2018

(65) Prior Publication Data
US 2020/0160092 A1 May 21, 2020

(51) Int. Cl.
G06K 9/62 (2006.01)
G06K 9/32 (2006.01)
G06K 9/46 (2006.01)

(52) U.S. Cl.
CPC ......... G06K 9/6202 (2013.01); G06K 9/3216 (2013.01); G06K 9/4604 (2013.01)

(58) Field of Classification Search
CPC ... G06K 9/4604; G06K 9/6202; G06K 9/3216
See application file for complete search history.

(56) References Cited

U.S. PATENT DOCUMENTS

| | | | | | |
|---|---|---|---|---|---|
| 4,601,575 | A | * | 7/1986 | Tamaki | G01M 11/0235 356/124 |
| 5,825,913 | A | * | 10/1998 | Rostami | G06T 7/73 382/151 |
| 6,191,406 | B1 | * | 2/2001 | Nelson | G06K 7/10574 250/208.1 |
| 7,581,488 | B2 | * | 9/2009 | Caswell | A47J 31/42 99/290 |
| 10,213,047 | B2 | * | 2/2019 | Boggavarapu | A47J 31/4492 |
| 10,314,319 | B2 | * | 6/2019 | Fu | A23F 5/105 |
| 2011/0127331 | A1 | * | 6/2011 | Zhao | G06K 7/10544 235/462.01 |
| 2015/0129655 | A1 | * | 5/2015 | Naik | G06K 19/14 235/375 |
| 2016/0174590 | A1 | * | 6/2016 | Boggavarapu | A47J 31/4492 426/433 |
| 2016/0210529 | A1 | * | 7/2016 | Nishiyuki | G06K 9/627 |
| 2017/0319060 | A1 | * | 11/2017 | Huang | A61B 3/1241 |
| 2019/0180464 | A1 | * | 6/2019 | Kraft | G06K 9/3241 |

* cited by examiner

*Primary Examiner* — Mia M Thomas
(74) *Attorney, Agent, or Firm* — Yuri Astvatsaturov

(57) ABSTRACT

A method and apparatus for template matching to find a predetermined pattern in an image is disclosed. A first visual boundary is detected in the captured image, and a second boundary concentric with the first boundary is calculated. The first and second boundaries define a portion of the captured image. The portion of the captured image is incrementally scanned about the center of the second boundary for a predetermined pattern having a predetermined orientation within the portion that match a template image. Alternatively, the portion of the captured image is unwrapped into a linear band image such that the first and second boundaries form a linear top and linear bottom of the linear band image, and the linear band image of the portion of the captured image is scanned for a predetermined pattern that matches a template image.

26 Claims, 5 Drawing Sheets

METHOD AND APPARATUS FOR VERIFICATION OF AN AUTHENTICATION SYMBOL

BACKGROUND OF THE INVENTION

Cartridges for use with beverage forming machines are well-known, and may include one or more filters as well as a beverage medium, such as ground coffee beans, tea leaves, etc. In many cases, the cartridges are specifically designed for the beverage forming apparatus, with the vendors of the cartridges and/or beverage medium being authorized to produce the cartridges and/or beverage medium. However, in other cases, unauthorized vendors of cartridges may also design cartridges for use with the beverage forming apparatus. It is in the interests of the vendor of the beverage forming apparatus and/or authorized vendors of cartridges to ensure that only authorized cartridges are utilized with the beverage forming apparatus.

In many cases, a vendor of the cartridges will provide a logo or label on the cartridge identifying the vendor. Within the logo, there is provided an authentication symbol that verifies the cartridge is from an authorized vendor. However, placement of the cartridge in the beverage forming machine and/or the orientation of the logo is not known by the beverage forming machine, thereby requiring the beverage forming machine to scan the entire logo at all possible orientations in order to find the authentication symbol.

Accordingly, there is a need for an improved method and apparatus for verification of an authentication symbol in a beverage forming machine.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
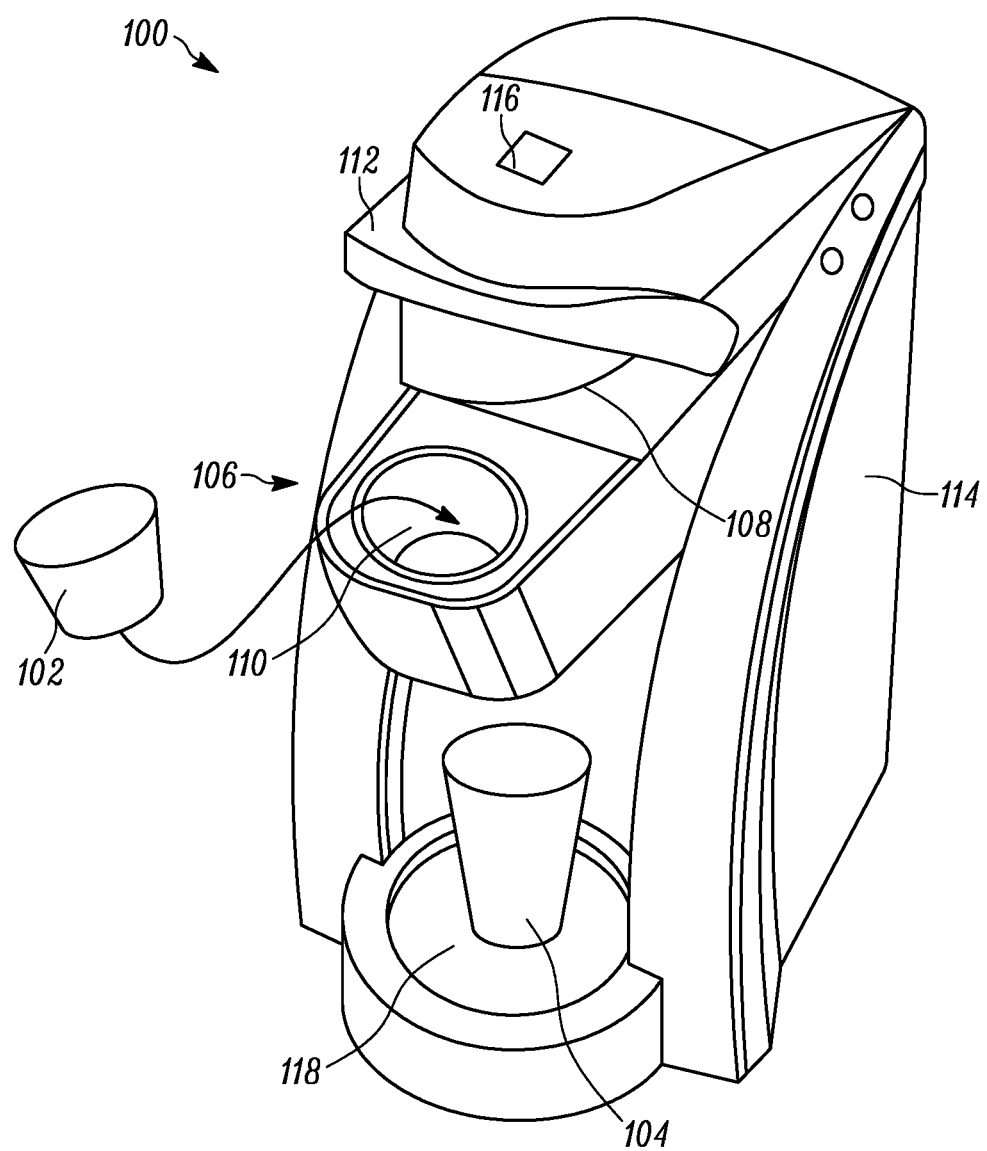
FIG. 1 is a front, perspective view of a beverage forming apparatus with a cartridge holder in an open position and a cartridge ready for insertion into the beverage forming apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides a method of template matching to find a predetermined pattern in an image captured by an image assembly. The method includes detecting a first visual boundary in the captured image, and calculating a second boundary concentric with the first visual boundary. The first and second boundaries define boundaries of a portion of the captured image. The method further includes unwrapping the portion of the captured image between the first and second boundaries into a linear band image such that the first and second boundaries form a linear top and linear bottom of the linear band image, and scanning the linear band image of the portion of the captured image for one or more predetermined patterns that match one or more template images.

Another aspect of the present disclosure provides a method of template matching to find a predetermined pattern in an image captured by an image assembly. The method includes detecting a first substantially circular visual boundary in the captured image, and calculating a second substantially circular boundary concentric with the first visual boundary. The first and second boundaries define a substantially circular band of a portion of the captured image. The method further incrementally scans the circular band about the center of the second boundary for one or more predetermined patterns having a predetermined orientation within the circular band that match one or more template images.

A further aspect of the present disclosure provides an image scanning apparatus that includes a housing having a cavity, an imaging assembly positioned within the cavity, and a controller operatively coupled to the imaging assembly. The imaging assembly has an imager and a field-of-view (FOV), the imager adapted to capture at least one of: light reflected from a symbol and light emitted from the symbol. The controller has a processor and a memory. The controller is adapted to detect a first visual boundary in an image captured by the imaging assembly, and calculate a second boundary concentric with the first visual boundary. The first and second boundaries define a nonlinear band of the captured image. The controller is further adapted to unwrap the nonlinear band of the captured image into a linear band image of the captured image such that the first and second boundaries form a linear top and linear bottom of the linear band image, and scan the linear band image of the captured image for one or more predetermined patterns that match one or more template images.

FIG. 1 is a front, perspective view of a known beverage forming apparatus 100 as disclosed in U.S. Pat. No. 9,295, 357, entitled "Apparatus for Cup and Carafe Beverage Production." The beverage forming system 100 is used to form any suitable beverage, such as tea, coffee, or other infusion-type beverages. Beverages may be formed from a liquid or powdered concentrate. Soups, juices or other beverages made from dried materials, may likewise be formed. A beverage cartridge 102 is provided to the system 100 and used to form a beverage that is deposited into a container, such as a cup 104. The cartridge 102 is manually or automatically placed in a cartridge receiver that includes a cartridge holder 106 and a cover 108. In an embodiment, the cartridge holder 106 has a circular, cup-shaped or otherwise suitably shaped opening 110 into which the cartridge 102 may be placed. The cartridge 102 has a corresponding shape and volume to fit securely within the cartridge holder 106. In this embodiment, the opening 110 is sized and shaped so as to engage with an upper portion of the cartridge 102 and suspend the cartridge 102 within the opening 110. However, the opening 110 may be arranged in other ways to engage the cartridge 102 within the opening 110, such as, for example, engaging with a lower portion, side, bottom or other part of the cartridge 102.

With a cartridge 102 placed in the cartridge holder 106, a handle 112 may be moved manually or automatically so as to move the cover 108 to cover at least a portion of the opening 110 and at least partially enclose the cartridge 102 within a chamber formed by the opening 110 and the cover 108, thereby moving the cartridge holder 106 to a closed position. For example, with the cartridge 102 held by the cartridge holder 106 in the closed position, water or other liquid may be provided to the cartridge 102, such as by injecting the liquid into the cartridge interior, to form a beverage that exits the cartridge 102 and is provided to the cup 104 or other container, as is well-known.

In this embodiment, the beverage forming apparatus 100 includes a housing 114 that houses and/or supports components of the apparatus 100, such as a user interface 116 used to control system operations, and defines a container receiving area 118 at which the cup 104 or container may be supported by the housing 114 and positioned to receive a beverage dispensed by the apparatus 100. The cup 104 or container may be received at the container receiving area 118 so that the container 104 is at least partially surrounded by the housing 114, or the container 104 may be more exposed when at the container receiving area 118.

Cartridges for use with beverage forming machines are well-known, and may include one or more filters as well as a beverage medium, such as ground coffee beans, tea leaves, etc. In many cases, the cartridges 102 are specifically designed for the beverage forming apparatus 100, with the vendors of the cartridges and/or beverage medium being authorized 102 to produce the cartridges and/or beverage medium. However, in other cases, unauthorized vendors of cartridges may also design cartridges for use with the beverage forming apparatus 100. It is in the interests of the vendor of the beverage forming apparatus and/or authorized vendors of cartridges to ensure that only authorized cartridges are utilized with the beverage forming apparatus 100.

In many cases, a vendor of the cartridges will provide a logo or label on the cartridge 102 identifying the vendor, often on the top 102a of the cartridge 102. Within the logo, there is provided an authentication symbol (also referred to as a predetermined pattern) that is scanned to verify that the cartridge 102 is from an authorized vendor. If the authentication symbol is not present or is not verified as being from an authorized vendor, a controller within the beverage forming apparatus 100 may preempt the beverage forming apparatus 100 from forming a beverage using the inserted cartridge 102. On the other hand, if the authentication symbol is verified as being from an authorized vendor, the controller permits the beverage forming apparatus 100 to form the beverage using the inserted cartridge 102.

Figure 2:
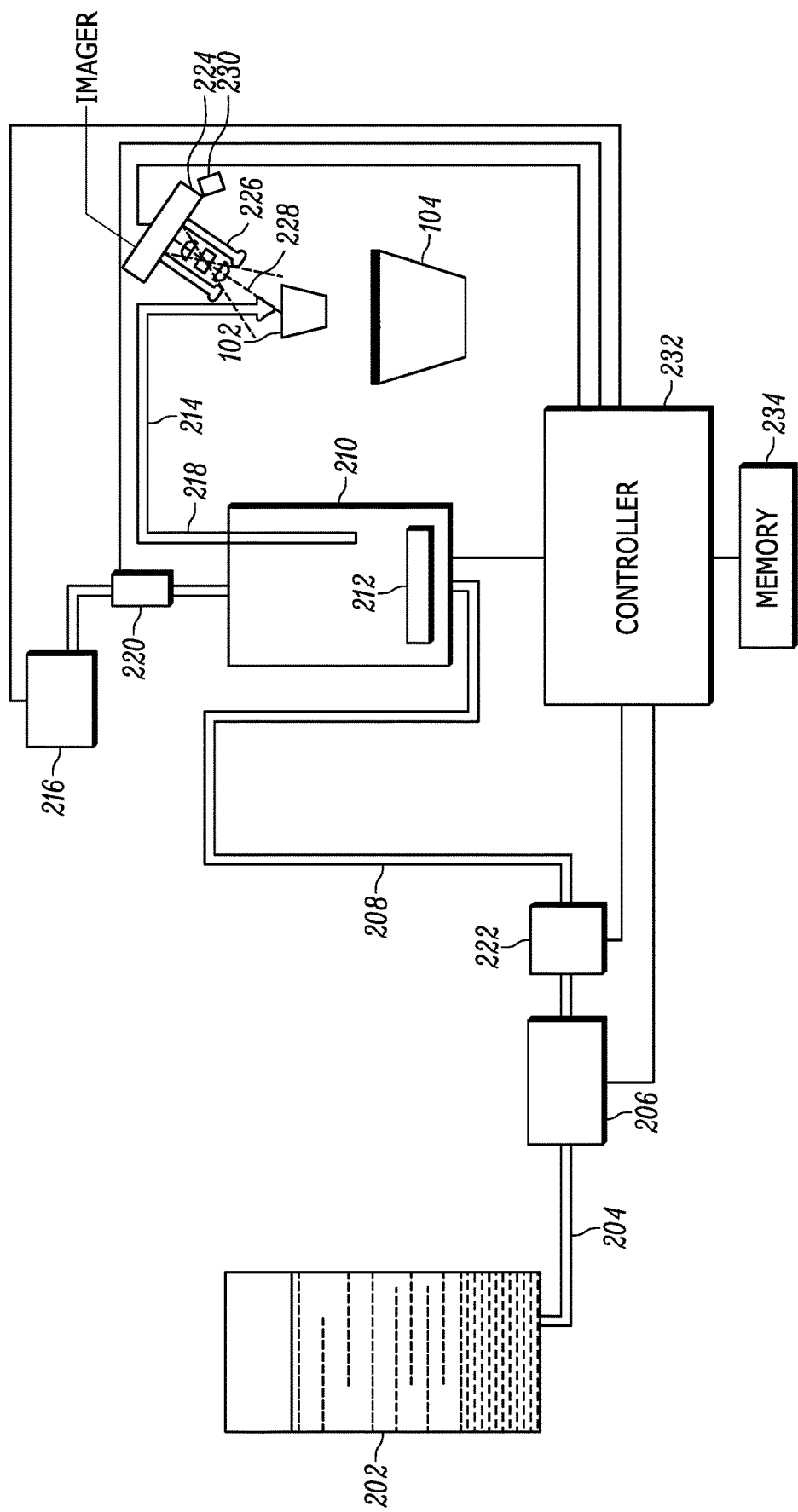
FIG. 2 is a block diagram of components of a beverage forming system in accordance with some embodiments.

FIG. 2 illustrates a block schematic diagram of a portion of a beverage forming apparatus 100 in accordance with some embodiments. It should be understood that FIG. 2 is not drawn to scale. Referring to FIG. 2, water or other liquid from a storage tank 202 is provided via a supply conduit 204 to a pump 206, which pumps the liquid via a pump conduit 208 to a heating tank or chamber 210. The pump 206 may be, but is not limited to, a centrifugal pump, a piston pump, a solenoid pump, or a diaphragm pump.

The heating tank 210 is filled with a desired amount of liquid by any suitable technique, such as running the pump 206 for a predetermined time, sensing a water level in the heating tank 210 using a conductive probe sensor or capacitive sensor, detecting a pressure rise in heating tank 210 when the liquid fills the tank, or using any other viable technique. For example, heating tank 210 is may be considered completely filled when a pressure sensor detects a rise in pressure indicating that the water has reached the top of the heating tank 210. Alternately, it may simply be assumed that the tank 210 is filled once a first fill operation is completed.

Water in the tank 210 is heated by a heating element 212 using input from a temperature sensor or other suitable input. The heated water is then dispensed via a heating tank conduit 214 to a cartridge chamber 216 or other beverage forming station. Although in this embodiment the conduit 214 is shown extending below the top of the tank 210, the conduit 214 may be arranged in any suitable way, such as connected simply to the top of the tank 210 without extending into the tank 210 at all.

Liquid is discharged from the heating tank 210 by pressurizing the metering tank with air provided by an air pump 216 that causes the liquid to be discharged out of a tube 218 and into the heating tank conduit 214. In particular, a specified volume of liquid may be delivered to the cartridge 102 by operating the pump 216 to deliver the specified volume of air to the tank 210 as measured by an air flow meter 220. In another embodiment, liquid is discharged from the heating tank 210 by the pump 206 operating to force additional liquid into the tank 210, thereby displacing water out of the tank 210 and to the cartridge 102. A liquid flow meter 222 or other suitable device (not shown) is used to determine the amount of liquid delivered to the tank 210, and thus the specified volume of liquid delivered to the cartridge 102. Alternately, the pump 206 may be a piston-type, diaphragm-type or other pump arranged such that a known volume of liquid may be delivered from the pump 206 to the tank 210, thus causing the same known volume to be delivered to the cartridge 102.

Liquid is introduced into the cartridge 102 at any suitable pressure (e.g., 1-2 psi or higher). Completion of the dispensation from the heating tank 210 is detected in any suitable way, such as by detecting a pressure drop in the heating tank 210, by detecting a water level change in the heating tank 210, use of a flow meter, or using any other viable techniques. Once liquid delivery by the pump 206 is complete, the air pump 216 forces air into the top of the tank 210 and/or into the conduit 204 so as to expend as much liquid from the conduit 204 and cartridge 102 as possible.

As also shown in FIG. 2, an imaging assembly includes a light-detecting sensor or image sensor 224, and is operatively coupled to, or mounted on, a printed circuit board (PCB) (not shown) in the apparatus. In an embodiment, the image sensor 224 is a solid-state device, for example, a CCD or a CMOS imager, having a two-dimensional array of addressable image sensors or pixels arranged in mutually orthogonal rows and columns, and operative for detecting return light captured by an imaging lens assembly 226 over a field of view along an imaging axis 228. The return light is scattered and/or reflected from a target, such as the top 102a of the cartridge 102. The imaging lens assembly 226 is operative for focusing the return light onto the array of image sensors to enable the target to be read.

An illuminating light assembly is also mounted in the imaging assembly. The illuminating light assembly includes an illumination light source, such as at least one light emitting diode (LED) 230 and at least one illumination lens (not shown), and preferably a plurality of illumination LEDs and illumination lenses, configured to generate a substantially uniform distributed illumination pattern of illumination light on and along the target to be read by image capture. At least part of the scattered and/or reflected return light is derived from the illumination pattern of light on and along the target.

Referring further to FIG. 2, the pump 206, heating element 212, air pump 216, flow meters 220, 222, imager 224, and illumination LED 230 are operatively connected to a controller or programmed microprocessor 232 operative for controlling the operation of these components. A memory 234 is connected and accessible to the controller 232. Preferably, the controller 232 is the same as the one used for processing the captured return light from the illuminated target to verify whether or not the cartridge 102 is authorized for use with the beverage forming apparatus 100.

FIGS. 3-7 depicts images of the target as captured by the imager 224, and scanned by the controller 232 in order to determine if a cartridge 102 inserted in the beverage forming apparatus 100 is authorized for use with the beverage forming apparatus 100. Beginning with FIG. 3, the imager 224 captures an image 300 of the target on the top 102a of the cartridge 102. The controller 232 utilizes an algorithm, which may be stored in the memory 234 and accessed/ instantiated by the controller 232, to detect a boundary on the top 102a of the cartridge 102.

Figure 3:
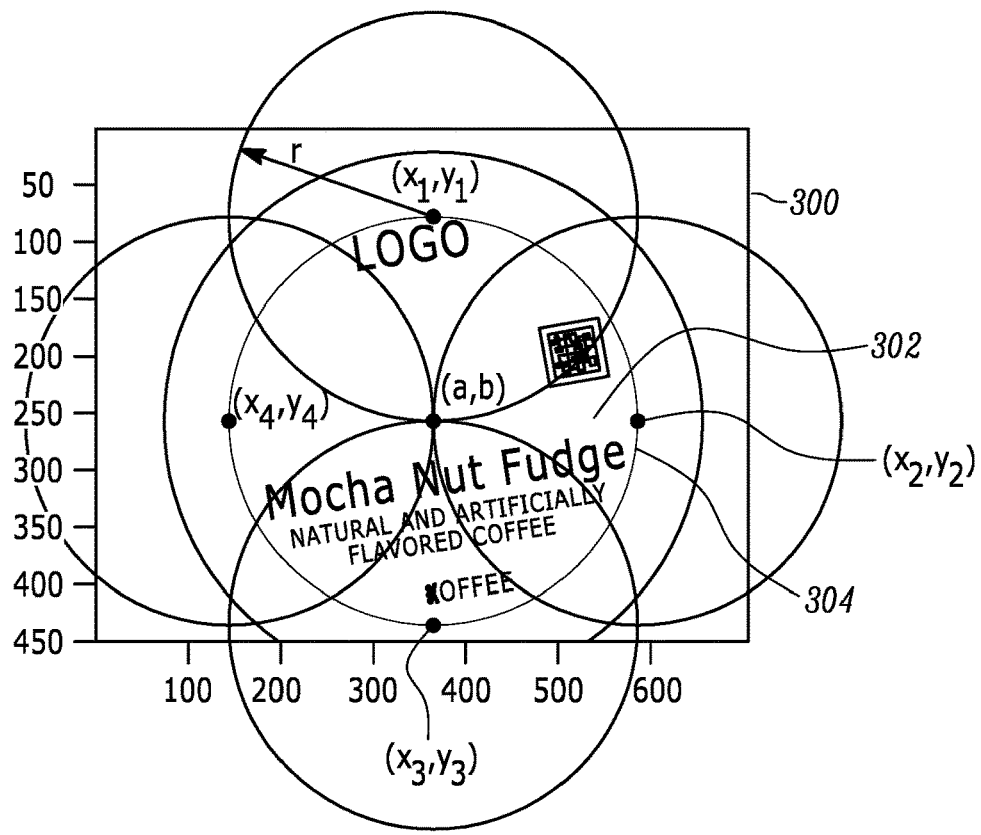
FIG. 3 is an image of a top view of a cartridge inserted in a beverage forming apparatus depicting boundary detection in accordance with some embodiments.

For example, as shown in FIG. 3, a logo or label 302 is printed or otherwise affixed to the top 102a of the cartridge 102, though the disclosed technique is applicable for verification of authentication symbols on different surfaces of the cartridge 102, if desired. In this case, the authentication symbol is printed as part of logo 302, so the algorithm will search for and detect a visual boundary 304 of the logo 302 as a reference for finding and verifying the authentication symbol. It is also possible to detect a visual boundary printed as part of the logo 302 itself.

The boundary of the logo 302 as detected by the controller 232 is depicted as a circle 304 for illustration purposes only, as the algorithm is equally applicable for detecting boundaries of different shapes. Preferably, however, the logo 302 is a circle as this maintains the resolution over the length of the linear band image resulting from unwrapping a circular band image, as discussed further below. In this particular instance, the logo 302 is not centered on the top 102a of the cartridge 102, in which case detection of the boundary of the logo 302 is preferred give that the symbol is within a particular location with respect to the logo 302, rather than with respect to the top 102a as a whole. Nonetheless, the boundary detection method may be utilized for finding the edge of the top 102a of the cartridge 102, as well or in the alternative. It is noted, however, that because the algorithm may detect both the edge of the top 102a as a boundary and the boundary 304 of the logo 302, in this embodiment the algorithm selects the smaller boundary when using the boundary 304 of the logo 302 as the reference.

As should be understood by those skilled in the art, there are many methods for boundary detection in a captured image, an example of which is the Hough transform, and, more specifically, a circle Hough transform for circle detection. Briefly, the Hough transform finds line or ellipses (including circles) in imperfect image inputs. The line/circle candidates are produced by "voting" in a Hough parameter space (i.e., the set of all possible combinations of values for all the different parameters contained in a particular mathematical model) and then the local maxima is selected in an "accumulator matrix". For example, in a two-dimensional space, a circle to be detected can be described by: $(x-a)^2 + (y-b)^2 = r^2$, where (a, b) is the center of the circle, and r is the radius. If the radius is fixed and known, then the parameter space is reduced to two dimensions (the position of the circle center). Referring to FIG. 3, for each $(x_i, y_i)$ of the points of the circular boundary 304 of the logo 302, the algorithm defines a circle in the parameter space centered at $(x_i, y_i)$ with radius r. The accumulator space tracks the intersection point. In the parameter space, the voting number of points through which the circle passes is increased by one. Then, the local maxima point through which all the circles in the parameter space intersect can be found, and the position (a, b) of the maxima is the center of the original circle.

In an embodiment, the Hough transform may be simplified if the radius, r, of the circle boundary 304 is already known, which is often the case for logos. In particular, the simplified Hough transform need only find one point, such as the point at $(x_1, y_1)$, along the line of the circular boundary 304 as first indicated above. Rather than find additional points $(x_i, y_i)$ on the circle and defining circles in the parameter space centered at each point $(x_i, y_i)$ with radius r, the simplified Hough transform may identify the gradient vector of the image of the circle boundary 304 at point $(x_1, y_1)$, which generally corresponds to the normal at point $(x_1, y_1)$ on the circle boundary 304. Using the gradient vector, or identified normal, at point $(x_1, y_1)$, the simplified Hough transform may then identify a point (a', b') as the center of the circle boundary 304 at a distance of the radius, r, from point $(x_1, y_1)$. It is noted that the correlation between identification of the gradient vector and the true normal is not absolute, such that a point (a', b') at distance, r, from the point $(x_1, y_1)$ is not necessarily the center of the circle boundary 304 at point (a, b). Accordingly, the simplified Hough transform may instead calculate an arc having radius, r, from point $(x_1, y_1)$, the arc being centered at the identified center (a', b'). For example, it may be assumed that the true normal of the circle boundary 304 at point $(x_1, y_1)$ is within 5 degrees of the identified normal as derived from the gradient vector. The true center (a, b) of the circle boundary 304 is then somewhere within 5 degrees of the identified center (a', b'), given that the true center (a, b) is known to be at a distance r from point $(x_1, y_1)$ on the circle boundary 304. The calculated arc may then be 10 degrees total and centered at (a', b'). From this arc, which is a limited set of points, the controller 232 may search for the circle boundary 304 as potentially being distance r from each point on the arc. For example, if the simplified Hough transform finds point $(x_2, y_2)$ at distance r from a point on the arc, then that point on the arc is the true center (a, b) of the circle boundary 304, and a circle of radius r calculated from the true center (a, b) then corresponds to the circle boundary 304.

As seen in FIG. 2, the imaging assembly, and, more particularly, the central imaging axis 228 is positioned at an oblique angle relative to the image plane (i.e., the plane of the top 102a of the cartridge 102), so as to avoid interference with the conduit 214. This may result in some perspective distortion of the first, visual boundary 304 in the capture of the image of the logo 302. For example, in the case of a circle, the first, visual boundary 304 may appear elliptical due to the angle of the central imaging axis 228 to the image plane. This perspective distortion may cause complications in accurately scanning for the authentication symbol due, in part, to the controller 232 searching for an undistorted version of the symbol, or to the controller 232 searching for a particular, purposeful or known distortion of the symbol originating from an undistorted version of the symbol, as described further below. The distortion may be determined by the controller 232 as part of the Hough transform or other edge detection technique.

Alternatively, the distortion may be approximated. For example, the angle of the central imaging axis 228 relative to the top 102a of the cartridge 102 may be approximated as being 25°, even though the exact angle is not known, but is known to be in the range of 20° and 30°. Similarly, although the distance of the image sensor 224 to the top 102a of the cartridge 102 is not known exactly, it may be estimated as $$d = \frac{W}{2 \cdot a \cdot \tan\left(\frac{FoV}{2}\right)}$$

where d denotes the distance between the cartridge and the camera, W denotes the width of the image in pixels, FoV denotes the field of view of the camera, and a denotes the length of the horizontal axis of the ellipse. Typically this distance is around 2 inches, with the distance known to be between 1 inch and 3 inches, and, more specifically, known to be approximately twice the diameter of the top 102a of the cartridge 102. With the approximate angle and approximate distance, the approximate major and minor axes of the perceived ellipse may be determined using the cosine of the approximate angle, α, which is the ratio of the major and minor axes of the perceived ellipse. A circle approximated therefrom is still considered efficient for the purpose of scanning for the symbol.

In yet another embodiment, an ellipse in the image of the top 102a may be detected based on the top 102a of the cartridge 102 being brighter relative to its environment, and the image sensor 224 assumed to be roughly aligned with a centerline of the top 102a. In particular, the aspect ratio between the minor (vertical with respect to the image sensor 224) and major (horizontal with respect to the image sensor 224) axes is approximately equal to cos(α), where α corresponds to the angle between central imaging axis 228 and the image plane (e.g., 25±5 degrees). In order to find the center, major axis, and minor axis of the ellipse, the technique first collects pixel values (pixel brightness) along the vertical centerline of the image, which roughly aligns with the vertical centerline of the top 102a in the image (based on the above assumption about the image sensor 224 alignment), and creates a waveform of the brightness along the vertical centerline of the image. In an embodiment, the vertical centerline of the image may be X pixels (e.g., 5 pixels) wide, with the technique using the brightest pixel in each X pixel array or using the average of the brightness of the X pixels in the array. Once the waveform is established, the first and last edge, and, in turn, the center, of the waveform may be readily determined based on the top 102a of the cartridge 102 being brighter relative to its environment. The center of the waveform corresponds to the vertical center, $C_V$, of the top 102a. Those of ordinary skill in the art will understand that the image sensor 224 may be calibrated to the center of the top 102a, in which case the distance between the first and last edge directly corresponds to the length of the minor (vertical) axis of the ellipse.

Having determined the vertical center, $C_V$, of the top 102a, the technique then collects pixel values (pixel brightness) along a horizontal centerline passing through $C_V$, and creates a waveform of the brightness along this horizontal centerline. Again, the first and last edge, and, in turn, the center, of the waveform of the horizontal line may be readily determined, where the center corresponds to the horizonal center, $C_H$, of the top 102a, and the distance between the first and last edge corresponds to the length of the major (horizontal) axis of the ellipse. If the image sensor 224 is not calibrated to the center of the top 102a, a second vertical line is passed through $C_H$, and a brightness waveform created along this second vertical line, where the distance between the first and last edge corresponds to the length of the minor (vertical) axis of the ellipse. Knowing the ratio between the major and minor axes, the image is stretched to become a circle in order to unwrap the image, as discussed further below.

The above technique operates under the condition that the cartridge 102 is brighter than its environment. However, if this does not hold true, an alternative ellipse detection technique that may be used is based on a rough approximation of the center of the top 102a in order to solve the equation of a circle: $(x-a)^2+(y-b)^2=r^2$, where (a, b) are the center coordinates of the circle, and r is the radius, all of which are unknown. In particular, using the center of the image and approximate radius of the top 102a in the image, two concentric circles may be created to form a band or ring containing the edge of the image of the top 102a. For example, if the radius of the top 102a in the image is approximately 55 pixels, concentric circles having radii of 40 pixels and 70 pixels provides a band having a width of 30 pixels with the edge of the top 102a being assumed to fall within the band, and the search for the ellipse being limited to this band.

The alternative technique then calculates image gradients (vector (Ix, Iy), where Ix, Iy correspond to derivatives of the image in horizontal and vertical directions within this band. For each point (Ix, Iy), the gradient is projected onto a vector between that point and estimated center of the ellipse (i.e., the center of the image). Again, the gradient vector at (Ix, Iy) generally corresponds to the normal at (Ix, Iy). Using the gradient vector, or identified normal, at (Ix, Iy) the technique identifies a point (a, b) as the estimated center of the ellipse at a distance of the radius, r, from point (Ix, Iy). In an embodiment, only the points for which the absolute value of this gradient is higher than threshold T (e.g., 40) are utilized, where the threshold depends on image exposure, and if necessary, may be calculated adaptively. If the polarity of the gradient is known (i.e. the outer band of the pod is brighter than the background of the coffee maker), then a constraint can be imposed that the gradient has to be less than −T (due to polarity).

Using these points, a least squares method may be used to estimate the ellipse, as follows:

Each candidate point corresponds to a constraint:

$(x_i-a)^2+(y_i-b)^2=r^2, \ldots, i=1,2,\ldots N$ where N is the total number of non-zero points.

This equation can be rewritten as:

$$x_i^2 - 2x_i a + a^2 + y_i^2 - 2y_i b + b^2 = r^2$$

or, by regrouping $$r^2 - a^2 - b^2 + 2x_i a + 2y_i b = x_i^2 + y_i^2$$

or by substituting, $c = r^2 - a^2 - b^2$, the equation may be rewritten as:

$$2x_i a + 2y_i b + c = x_i^2 + y_i^2, i=1,2,\ldots,N.$$

This equation can be rewritten in Matrix vector form as:

$$\begin{bmatrix} 2x_1 & 2y_1 & 1 \\ \ldots & \ldots & \ldots \\ 2x_N & 2y_N & 1 \end{bmatrix} \begin{bmatrix} a \\ b \\ c \end{bmatrix} = \begin{bmatrix} x_1^2 + y_1^2 \\ \ldots \\ x_N^2 + y_N^2 \end{bmatrix}$$

or as:

$$Ap = d$$

where:

$$A = \begin{bmatrix} 2x_1 & 2y_1 & 1 \\ \ldots & \ldots & \ldots \\ 2x_N & 2y_N & 1 \end{bmatrix}$$

$$p = \begin{bmatrix} a \\ b \\ c \end{bmatrix}$$

$$d = \begin{bmatrix} x_1^2 + y_1^2 \\ \ldots \\ x_N^2 + y_N^2 \end{bmatrix}$$

This may be solved using pseudoinverse as:

$$p = (A^T A)^{-1} A^T d$$

From $c = r^2 - a^2 - b^2$, the radius, r, may be derived:

$$r = \sqrt{c + a^2 + b^2}.$$

The above alternative technique results in a good approximation of the ellipse in the image of the top 102a, and may be reiterated using the estimated center and radius solved above as a starting point to create two concentric circles to form a band or ring containing the edge of the image of the top 102a, and restricting the width of the band or ring even further. In an embodiment, the image may be stretched for a nominal factor of 1/cos(25 degrees)=1.1, in which case the ellipse may be sufficiently fitted to the image of the top 102a after only one iteration.

While some perspective distortion may be tolerable in the Hough transform, in other cases the controller 232 transforms the elliptical image of the first, visual boundary into a circle. Preferably, the controller 232 executes this transformation if the ratio between the major and minor axes of the ellipse is greater than 2. An example technique for correcting for perspective distortion is projective geometry, though this may result in too many computations for the controller 232 to execute to find the symbol. For instance, the unwarping equations may be modified so as to apply unwarping to the original image. This is just approximate unwarping, as it does not take into account projective distortion, but only rotation. Projective transformation equations may improve the results even more. However, the less computer intensive approach is a simple approximation that stretches, and sometimes scales, the ellipse and approximates the result with a circle, which may lose some precision, but not negatively influence the results in finding and verifying the authentication symbol.

Figure 4:
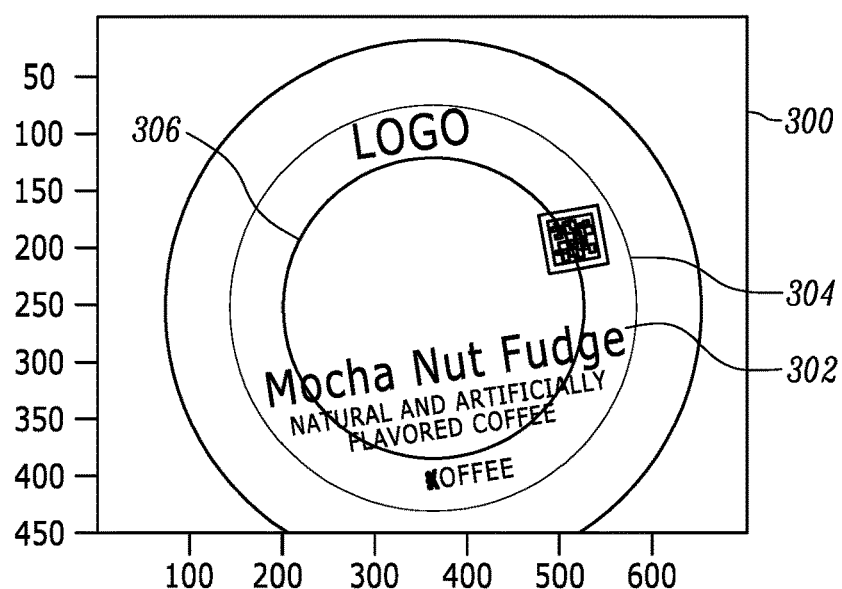
FIG. 4 is an image of a top view of a cartridge inserted in a beverage forming apparatus depicting concentric secondary boundary calculation in accordance with some embodiments.

Referring to FIG. 4, having detected the first, visual boundary 304 of the logo 302 (or top 102a) and/or corrected for any distortion of the first, visual boundary 304 due to the angle of the central imaging axis 228 incident upon the top 102a of the cartridge 102, the controller 232 calculates a second, imaginary (i.e., non-visual) boundary 306 that is concentric with the detected visual boundary 304. In the case of a circle, the second boundary 306 is a concentric circle sharing the same center as the first, visual boundary 304, though a concentric boundary may be determined with other shapes as well. More particularly, the second boundary 306 is calculated to be concentric with the first, visual boundary 304 by a set distance from the first, visual boundary 304, depending on the location of the authentication symbol. For example, if the authentication symbol is known by the controller 232 to be within X millimeters (or Y pixels) inside the first, visual boundary 304 of the circular logo 302, the second boundary 306 may be calculated as being a concentric circle with a radius that is at least X millimeters less (or at least Y pixels less) than the first, visual boundary 304. In another example, the second boundary 306 may be calculated as being a concentric circle that is a scaled version of the first, visual boundary 304 (e.g., at least less than 100% of the first boundary radius, at least more than 100% of the first boundary radius, between 55-75% of the edge of the top 102a of the cartridge 102 if searching for the authentication symbol within the first visual boundary 304, between 75-100% of the edge of the top 102a of the cartridge 102 if searching for the authentication symbol outside the first visual boundary, etc.).

Figure 5:
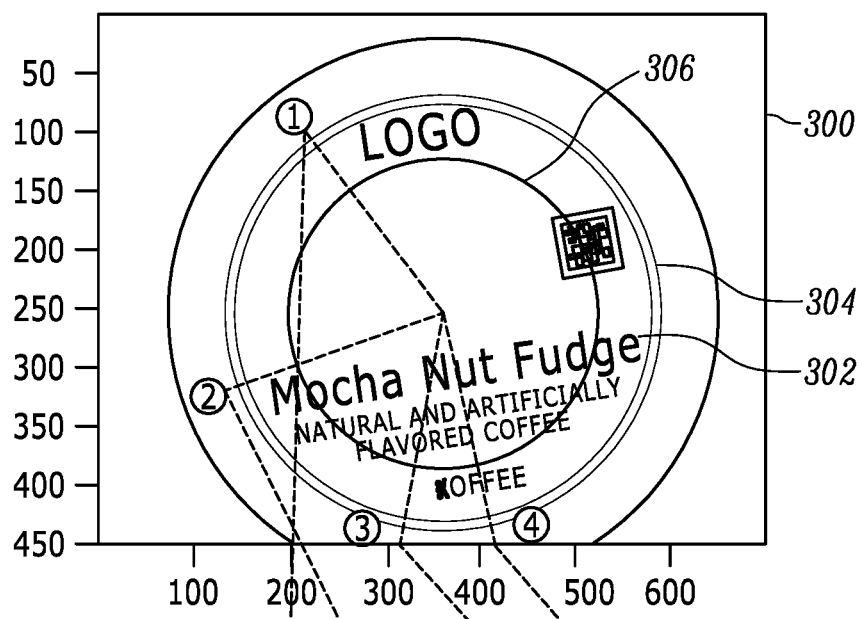
FIG. 5 is an image of a top view of a cartridge inserted in a beverage forming apparatus depicting imaging a portion of the top of the cartridge in accordance with some embodiments.

Referring to FIG. 5, the portion of the image between the first and second boundaries 304, 306 is incrementally captured about the center of the boundaries 304, 306. That is, only the area of the image between the first and second boundaries 304, 306 is captured. In FIG. 5, the incremental capture is performed in a counterclockwise manner, though the scan may be also be performed in a clockwise manner. In either case, the image capture is a radial pattern about the center of the boundaries 304, 306 by at least 360 degrees. Because the position of the logo 302 is unknown, the image capture may inadvertently begin in the middle of the symbol in some instances, in which case a 360 degree image capture results in part of the symbol at the beginning of the image capture, and the remaining part of the symbol at the end of the image capture, with no full image of the symbol being mapped to the linear band image. Accordingly, the image capture is at least 360 degrees about the center of the boundaries 304, 306, and preferably 380 degrees about the center of the boundaries 304, 306 so as to successively capture and map a full image of the symbol to the linear band image.

The incremental captures of the image between the first and second boundaries 304, 306 are taken in equidistant segments, where each increment involves capturing image data of each segment of the portion of the image between the first and second boundaries 304, 306. For example, a capture may be taken in one degree increments about the center of the first and second boundaries 304, 306, with the segment of the portion of the image defined by the one degree increment being captured. Although two embodiments for scanning for the authentication symbol are disclosed below, limiting the image capture to the portion of the image between the first and second boundaries 304, 306 reduces the amount of area of the logo 302 that the controller 232 needs to scan to find the authentication symbol, which leads to faster verification times and less processing power.

In an embodiment, the captured image segments are scanned for the symbol, where a series of captured image segments provide a complete picture of the symbol. More particularly, incrementally capturing the portion of the image about the center of the boundaries 304, 306 results in only the area of the image between the first and second boundaries 304, 306 being scanned. This reduces the amount of area of the logo 302 that the controller 232 needs to scan to find the authentication symbol, which leads to faster verification times and less processing power.

In this example, the "K" in "KOFFEE" is a unique symbol designating the cartridge 102 as being from an authorized vendor of the cartridge 102, though it should be well-understood by those of ordinary skill in the art that different unique symbols may be utilized other than letters or numbers. The "K", or other symbol, has a standard orientation within the band between the first and second boundaries 304, 306. That is, the symbol maintains the same orientation relative to the center of the boundaries 304, 306 no matter the orientation of the cartridge 102. For example, in the case of a circular band the central vertical axis of the "K" is always parallel with the radii of the boundaries 304, 306.

Knowing that the symbol has a predetermined orientation between the boundaries 304, 306 even if the orientation of the logo 302 is unknown, the controller 232 reads the image captures at different orientations to search for the symbol. For example, having captured the portion of the image of the logo 302, the controller 232 scans the portion of the logo 302 for the symbol, adjusting the scan orientation for each increment around the band. Alternatively, the controller 232 scans each image segment as it is captured to search for particular, unique features of the symbol, which, if found, may then trigger the controller 232 to search for subsequent unique features of the symbol in the subsequently captured image segments. The symbol on the logo 302 must match at least a threshold number of the unique features (e.g., 5 out of 7) in order for the cartridge 102 to be verified as from an authorized vendor.

In this case, the controller 232 may be calibrated to search for an undistorted, original symbol, such as the original, undistorted "K" as shown in the logo 302 of FIGS. 3-5. Provided that the controller 232 matches the scanned symbol in the logo 302 with the symbol template stored in the memory 234 from calibration, the controller 232 verifies that the cartridge 102 is from an authorized vendor, and proceeds with control of the beverage forming apparatus 100 to form a beverage, such as dispensing heated water through the conduit 214 to the cartridge 102. If the scanned symbol in the logo 302 does not match the symbol template stored in the memory 234, the controller 232 may instead indicate an error, such as a display or light on the user interface 116, but otherwise does not proceed with control of the beverage forming apparatus 100 to produce a beverage. It should be understood that the match between the symbol on the logo 302 and the symbol template stored in the memory 234 does not necessarily need to be exact. For example, it may be sufficient that the symbols have at least a threshold degree of match, such as at least a 90% match, in order to verify the cartridge 102 is authorized.

In another embodiment, the captured image segments are mapped into a linear band image, which is then scanned for the symbol, as described below. Not only does this reduce the amount of area of the logo 302 that the controller 232 scans to find the authentication symbol as with the previous embodiment, but this embodiment results in even fewer computations for the controller 232 to execute to find the symbol, thereby leading to even faster verification times and less processing power than the previously disclosed embodiment. For example, if the controller 232 were to search for a symbol (sized m×n) against an image of the entire logo 302 (sized M×N) when the orientation (and, to a lesser extent, scale) of the logo 302 is unknown, the number of computations is m×n×M×N×S×R, where S and R correspond to scale and orientation resolution, respectively. Typically, S×R>100. However, by unwrapping the nonlinear image into a linear image so as to obviate the orientation of the cartridge 102 during scanning, the number of computations is reduced to m×n×M×N.

Generally speaking, the granularity of the scans (e.g., the size of the increments) correlates with the vertical resolution of the linear band image. Preferably, the granularity of the scan is such that the vertical resolution of the linear band image is within 5% and 15% of the vertical resolution of the captured image of the logo 302. Those skilled in the art will recognize that the level of granularity of the scans (e.g., half degree, quarter degree, etc.) may depend on the unwrapped image used to calibrate the controller 232. For example, the controller 232 is calibrated to search for the distorted symbol. In unwrapping the portion of the image, the details of the image, inclusive of the symbol, may be somewhat warped. If the controller 232 was calibrated to search for and verify a warped symbol in the unwrapped image based on a particular scan granularity, a different scan granularity may warp the symbol into something that would not be recognized by the controller 232.

Figure 6:
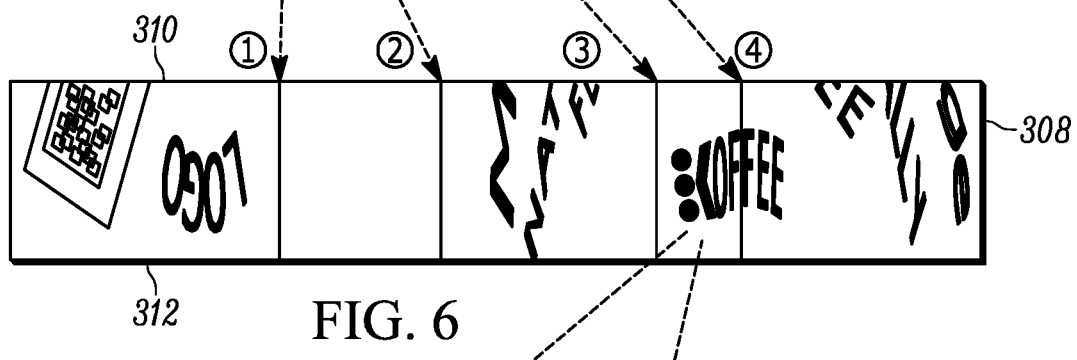
FIG. 6 is an image of the imaged portion of FIG. 5 that has been linearly unwrapped in accordance with some embodiments.

As mentioned, with each image capture, the captured portion of the image is mapped to a linear band image 308, as shown in FIG. 6 in relation to FIG. 5 to unwrap the image and reduce the scan of a two-dimensional X-Y space of the non-linear band image to a scan of a one-dimensional X space in the linear band image. In this case, the scanned portion of the image between the first and second boundaries 304, 306 is unwrapped such that the second boundary 306 forms the linear top boundary 310 of the linear band image 308 and the first boundary 304 forms the linear bottom boundary 312 of the linear band image 308. Of course, it is also understood that the second boundary 306 may form the linear bottom boundary 310 and the first boundary 304 may form the linear top boundary 308 depending on whether the second boundary 306 is scaled smaller or larger than the first, visual boundary 304 and/or the orientation of the symbol in the logo 302.

More specifically, each incremental capture of the portion of the image is successively mapped to the linear band image 308. For example, at increment "1" in the capture in FIG. 5, the image segment of the portion between the first and second boundaries is mapped to increment "1" in FIG. 6. Similarly, moving in a counterclockwise rotation, at increments "2", "3" and "4" in FIG. 5, the image segment of the portion of the logo 302 is mapped, respectively, to increments "2", "3" and "4" in the linear band image of FIG. 6. Although designated as "1, 2, 3, 4", these are not successive increments (i.e., one right after another), but rather are so-designated to demonstrate how different image segments of the portion of the image are mapped to the linear band image 308. In practice, image segments are captured and mapped in successive increments so as to map the entire portion of the image to the linear band image 308.

Of particular note is increment "3" which captures a segment of the "K" in the portion of the image. Again, the "K" is considered a unique symbol designating the cartridge 102 as being from an authorized vendor of the cartridge 102. Successive incremental captures of the "K" in the portion of the image result in the mapped image of the entire "K" (i.e., the entire symbol) in the linear band image 308. As seen in FIG. 6, and, more particularly FIG. 7, as compared to FIG. 5, the "K" is somewhat distorted or warped in the linear band image 308 as a result of the unwrapping process. Nonetheless, the controller 232 of the beverage forming apparatus 100 may be calibrated to search for a particular, purposeful or known distorted/warped image of the "K" rather than the original, undistorted image of the "K" in order to verify the authenticity of the cartridge 102, particularly given that the distortion is invariant to the orientation of the cartridge 102 (because the symbol maintains its orientation with respect to the cartridge 102) such that the controller 232 is calibrated to search for the distorted symbol once, which is usable for all orientations of the cartridge 102. Given that the granularity of the capture of the portion of the image is generally not known outside of the controller 232, which correlates with the distortion of the symbol in the linear band image 308, this adds an additional level of security against unauthorized cartridges that attempt to counterfeit the symbol, as the original symbol may be publicly known, but the distorted symbol is not.

Figure 7:
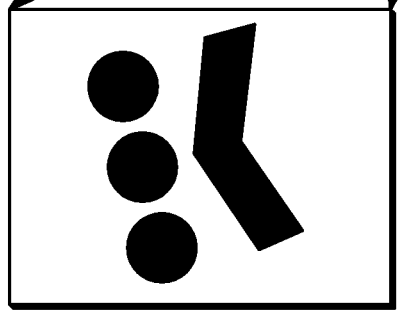
FIG. 7 is a magnified view of a portion of the image portion of an authentication symbol within the imaged portion of FIG. 5 that has been linearly unwrapped in accordance with some embodiments.

Having unwrapped the portion of the image of the logo 302 into a linear band image 308, the controller 232 scans the linear band image 308 for the symbol. Again, the controller 232 may be calibrated to search for the distorted symbol, such as the distorted "K" as shown in FIG. 7, as opposed to the original symbol, such as the original "K" as shown in the logo 302 of FIGS. 3-5. Provided that the controller 232 matches the distorted symbol in the logo 302 with the distorted symbol template stored in the memory 234 from calibration, the controller 232 may verify that the cartridge 102 is from an authorized vendor, and proceed with control of the beverage forming apparatus 100 to form a beverage, such as dispensing heated water through the conduit 214 to the cartridge 102. If the distorted symbol in the logo 302 does not match the distorted symbol template stored in the memory 234, the controller 232 does not proceed with control of the beverage forming apparatus 100 to produce a beverage, and may instead indicate an error, such as a display or light on the user interface 116. It should be understood that the match between the distorted symbol on the logo 302 and the distorted symbol template stored in memory 234 does not necessarily need to be exact. For example, it may be sufficient that the distorted symbols have at least a threshold degree of match, such as at least a 90% match, in order to verify the cartridge 102 is authorized. In other cases, the distorted symbol may have a number of unique features, and the distorted symbol on the logo 302 must match at least a threshold number of the unique features (e.g., 5 out of 7) in order for the cartridge 102 to be verified as from an authorized vendor.

Figure 8:
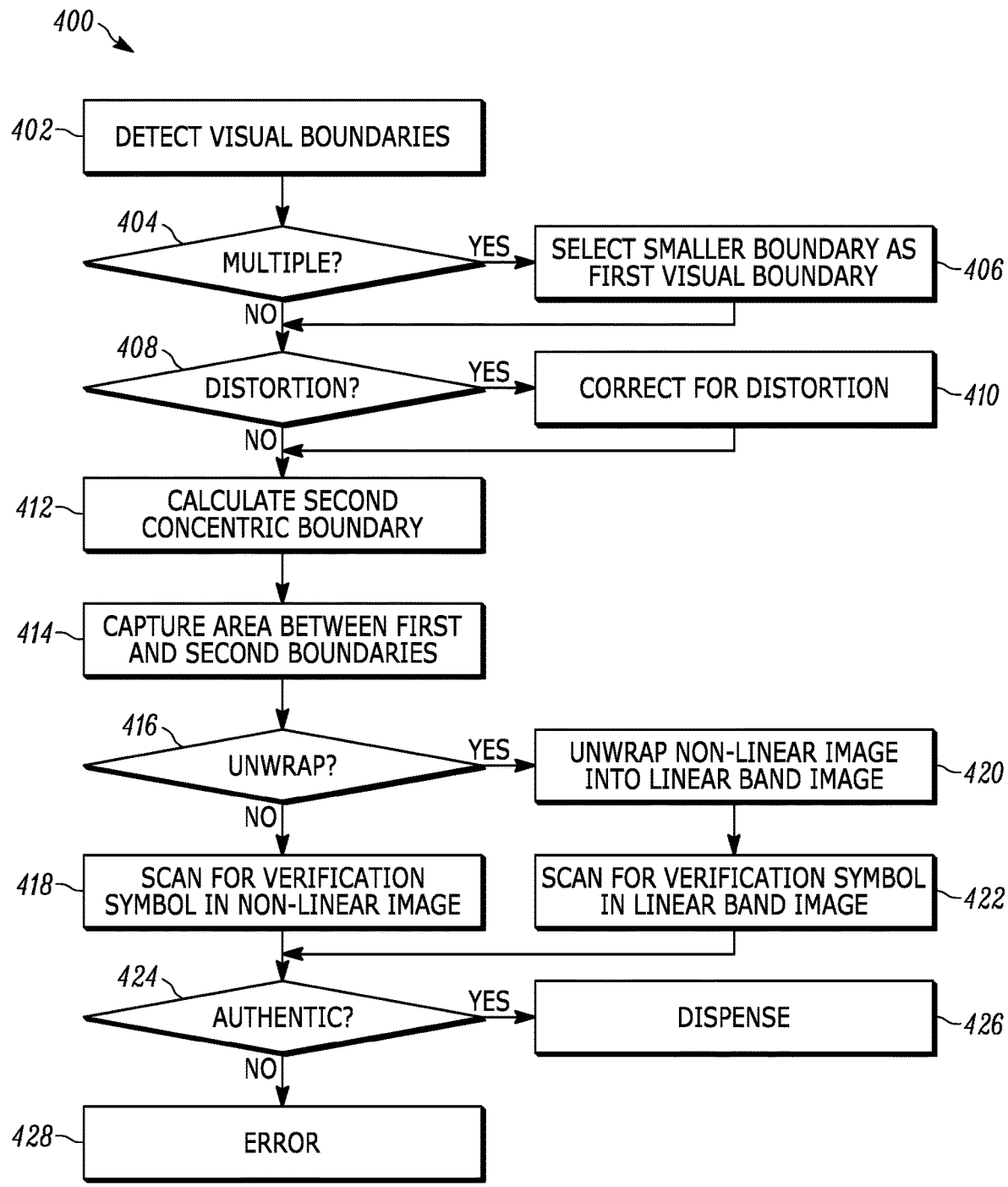
FIG. 8 is a block diagram of a method of verifying the authentication symbol on a beverage cartridge in accordance with some embodiments.

FIG. 8 is a flowchart of a control routine 400 for the controller 232 to verify the authentication symbol on a beverage cartridge 102 in a beverage forming apparatus 100 according to some of the embodiments discussed above. The control routine 400 may be instantiated and executed once a cartridge 102 has been placed in the opening 110 of the cartridge holder 106, and the cover 108 moved to at least partially enclose the cartridge 102 within the chamber formed by the opening 110 and the cover 108 (i.e., a closed position for the cartridge holder 106). A sensor may be triggered once the cartridge holder 106 is in a closed position, and signal the controller 232 that the beverage forming apparatus is ready to dispense a beverage. Alternatively, the user may utilize the user interface 116 to begin operation to dispense the beverage, which, in turn, instantiates the control routine 400.

Beginning at block 402, the control routine 400 detects one or more visual boundaries in the top 102a of the cartridge 102, as discussed above with respect to FIG. 3, using, for example, the Hough transform. If more than one visual boundary is detected at block 404, such as the edge of the top 102a of the cartridge 102 in addition to the visual boundary 304 in the logo 302, the control routine 400 selects the smaller of the multiple boundaries at block 406 as the first, visual boundary 304. If only one boundary is detected, the control routine 400 proceeds with the detected boundary as the first, visual boundary 304.

At block 408, the control routine 400 determines whether there may be any distortion in the image of the first, visual boundary 304. In particular, if the central imaging axis 228 of the imaging assembly is at an oblique angle relative to a central axis of the cartridge 102 normal to the top 102a of the cartridge 102, there may be some distortion in the image of the first, visual boundary 304. For example, a circular visual boundary 304 may appear elliptical in the image captured by the imaging assembly. If the controller 232 determines that the image of the visual boundary 304 is distorted (e.g., by comparison to an undistorted image of the first, visual boundary stored in the memory 234 from calibration), the controller 232 may correct for the distortion at block 410, as described above. On the other hand, if there is no distortion, or the degree of distortion is within tolerances for scanning for the authentication symbol, the control routine 400 may proceed without correcting for distortion. In an alternative embodiment, if the angle of the central imaging axis 228 relative to the central axis of the cartridge 102 is known to cause distortion (e.g., the angle between the central imaging axis 228 and the axis normal to the top 102a of the cartridge 102 being more than 20 degrees), the determination step at block 408 may be obviated, and the controller 232 may automatically correct for distortion at block 410.

At block 412, the control routine 400 calculates a second, non-visual boundary 306, as discussed above with respect to FIG. 4. Briefly, the second boundary 306 is calculated by the controller 232 to be concentric with the detected first, visual boundary 304 by a set distance (e.g., X millimeters or Y pixels) from the first, visual boundary 304, or as a scaled version of the first, visual boundary 304 (e.g., 80-90%) so as to create a nonlinear band or portion of the image of the logo 302 that is inclusive of the location of the authentication symbol, albeit without knowing the orientation of the logo 302.

Having defined a nonlinear band or portion of the image of the logo 302 in which the authentication symbol is located, the controller 232 proceeds to incrementally capture the portion of the image between the first and second boundaries 304, 306 at block 414, as described above with FIG. 5. For example, the controller 232 may radially capture the portion of the image between the boundaries 304, 306 about the center of the boundaries 304, 306 in equidistant segments with some overlap (e.g., by 20 degrees) so as to ensure the entire authentication symbol is successively captured. As discussed above, the scan of the captured portion of the image of the logo 302 may involve unwrapping the portion of the nonlinear image into a linear band image and scanning the linear band image for a distorted version of the symbol, or scanning the captures of the non-linear image at different orientations to search for an undistorted version of the symbol. Accordingly, at block 416, the control routine 400 provides an option as to how to scan the portion of the image between the boundaries 304, 306. As noted above, however, unwrapping the nonlinear portion of the image between the boundaries 304, 306 into a linear band image results in a faster method of scanning for the authentication symbol with fewer computations than scanning the nonlinear image. As such, the control routine 400 may not provide the option at block 416, and rather proceed with unwrapping the non-linear image into a linear band image by default.

In any case, the control routine 400 proceeds to scan the nonlinear portion of the image between the boundaries 304, 306 at block 418, knowing that the symbol has a predetermined orientation between the boundaries 304, 306 even if the orientation of the logo 302 is unknown. As disclosed above, the controller 232 reads the captures at different orientations to search for the undistorted, original authentication symbol. On the other hand, the controller 232 may first unwrap the nonlinear portion of the image between the boundaries 304, 306 into a linear band image at block 420, as disclosed above, and scan the nonlinear band image for a distorted version of the authentication symbol at block 422.

Whether scanning for an original, undistorted version of the symbol or a distorted version of the symbol due to unwrapping, at block 424 the control routine 400 compares the scanned symbol with a symbol (distorted or undistorted) template stored in the memory 234 from calibration of the controller 232. If there is a match (within certain tolerances), the controller 232 proceeds with the dispensation of the beverage at block 426, or generates an error at block 428 if the symbol is determined to be unauthentic.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of template matching to find a predetermined pattern in an image captured by an image assembly, the method comprising:
   detecting a first visual boundary in the captured image;
   calculating a second boundary concentric with the first visual boundary, wherein the first visual boundary and the second boundary define boundaries of a portion of the captured image;
   unwrapping the portion of the captured image between the first visual boundary and the second boundary into a linear band image such that the first visual boundary and the second boundary form a linear top and linear bottom of the linear band image; and
   scanning the linear band image of the portion of the captured image for one or more predetermined patterns that match one or more template images.

2. The method of claim 1, wherein unwrapping the portion of the image comprises:
   incrementally capturing the portion of the image between the first visual boundary and the second boundary about the center of the second boundary, wherein each increment is defined by equidistant segments of the portion of the image, and wherein each of the incrementally capturing comprises capturing image data of each segment of the portion of the image between the first visual boundary and the second boundary; and
   successively mapping the image data of each segment to a different successive column of the linear band image.

3. The method of claim 2, wherein incrementally capturing the portion of the image between the first visual boundary and the second boundary comprises incrementally capturing the portion of the image between the first visual boundary and the second boundary at least 360 degrees about the center of the second boundary.

4. The method of claim 3, wherein incrementally capturing the portion of the image between the first visual boundary and the second boundary comprises incrementally capturing the portion of the image between the first visual boundary and the second boundary and between 360 degrees and 380 degrees about the center of the second boundary.

5. The method of claim 1, wherein detecting the first visual boundary comprises detecting an edge in the captured image, and wherein calculating a second boundary comprises calculating the second boundary as a predetermined distance from the first visual boundary.

6. The method of claim 1, wherein detecting the first visual boundary in the captured image comprises:
   detecting a plurality of visual boundaries in the captured image on a surface upon which the first visual boundary is placed, wherein at least one of the plurality of visual boundaries corresponds to the first visual boundary and at least one of the plurality of visual boundaries corresponds to an edge of the surface in the captured image; and
   selecting the smaller of the plurality of boundaries as the first visual boundary.

7. The method of claim 1, wherein the first visual boundary and the second boundary are substantially circular.

8. The method of claim 1, wherein the second boundary is a scaled version of the first visual boundary of less than 100%, and concentric with the first visual boundary.

9. The method of claim 1, further comprising:
   determining the shape of the first visual boundary in the captured image; and
   transforming the shape of the first visual boundary into a circle in response to the shape of the first visual boundary determined as being an ellipse.

10. The method of claim 9, wherein the step of determining is performed in response to a ratio between a major axis of the ellipse and a minor axis of the ellipse being greater than 2%.

11. The method of claim 1, wherein the linear band image comprises a vertical resolution within the range of 5% to 15% of the vertical resolution of the captured image.

12. A method of template matching to find a predetermined pattern in an image captured by an image assembly, the method comprising:
   detecting a first substantially circular visual boundary in the captured image;
   calculating a second substantially circular boundary concentric with the first substantially circular visual boundary, and wherein the first substantially circular visual boundary and the second substantially circular boundary define a substantially circular band of a portion of the captured image; and
   incrementally scanning the circular band about the center of the second substantially circular boundary for one or more predetermined patterns having a predetermined orientation within the circular band that match one or more template images,
   wherein detecting the first substantially circular visual boundary comprises detecting a substantially circular edge in the captured image, and wherein calculating a second substantially circular boundary comprises calculating the second substantially circular boundary as a scale of the first substantially circular visual boundary.

13. The method of claim 12, wherein incrementally scanning the circular band comprises incrementally scanning the circular band at least 360 degrees about the center of the second substantially circular boundary.

14. The method of claim 13, wherein incrementally scanning the circular band comprises incrementally scanning between 360 degree and 380 degrees about the center of the second substantially circular boundary.

15. The method of claim 12, wherein the second substantially circular boundary is a scaled version of the first substantially circular visual boundary of between 55% and 75%, and concentric with the first substantially circular visual boundary.

16. The method of claim 12, wherein the second substantially circular boundary is a scaled version of the first substantially circular visual boundary of between 75% and 100%, and concentric with the first substantially circular visual boundary.

17. The method of claim 12, wherein detecting the first substantially circular visual boundary in the captured image comprises:
   detecting a plurality of boundaries in the captured image on a surface upon which the first substantially circular visual boundary is placed, wherein at least one of the plurality of boundaries corresponds to the first substantially circular visual boundary and at least one of the plurality of boundaries corresponds to an edge of the surface in the captured image; and
   selecting the smaller of the plurality of boundaries as the first substantially circular visual boundary.

18. The method of claim 12, wherein detecting the first substantially circular visual boundary comprises:
   determining the shape of the first substantially circular visual boundary in the captured image; and
   transforming the shape of the first substantially circular visual boundary into a circle in response to the shape of the first substantially circular visual boundary determined as being an ellipse.

19. The method of claim 18, wherein the step of determining is performed in response to a ratio between a major axis of the ellipse and a minor axis of the ellipse being greater than 2%.

20. An image scanning apparatus comprising:
   a housing having a cavity;
   an imaging assembly positioned within the cavity, the imaging assembly having an imager and a field-of-view (FOV), the imager adapted to capture at least one of: light reflected from a symbol and light emitted from the symbol;
   a controller operatively coupled to the imaging assembly, the controller having a processor and a memory, wherein the controller is adapted to:
      detect a first visual boundary in an image captured by the imaging assembly;
      calculate a second boundary concentric with the first visual boundary, wherein the first and second boundaries define a nonlinear band of the captured image;
      unwrap the nonlinear band of the captured image into a linear band image of the captured image such that the first visual boundary and the second boundary form a linear top and linear bottom of the linear band image; and
      scan the linear band image of the captured image for one or more predetermined patterns that match one or more template images.

21. The image scanning apparatus of claim 20, wherein the controller is further adapted to:
   incrementally capture the nonlinear band of the image about the center of the nonlinear band, wherein each increment is defined by equidistant segments of the portion of the image, and wherein each of the incrementally capture comprises causing the imaging assembly to capture image data of each segment of the nonlinear band image; and
   successively map the image data of each segment to a different successive column of the linear band image.

22. The image scanning apparatus of claim 21, wherein the controller is adapted to incrementally scan the nonlinear band at least 360 degrees about the center of the nonlinear band.

23. The image scanning apparatus of claim 22, wherein the controller is adapted to incrementally scan the nonlinear band between 360 degree and 380 degrees about the center of the nonlinear band.

24. The image scanning apparatus of claim 20, wherein the controller is adapted to calculate the second boundary as a scaled version of the first visual boundary of less than 100%, and concentric with the first visual boundary.

25. The image scanning apparatus of claim 20, wherein the controller is further adapted to:
   detect a plurality of boundaries in the captured image on a surface upon which the first visual boundary is placed, wherein at least one of the plurality of boundaries corresponds to the first visual boundary and at least one of the plurality of boundaries corresponds to an edge of the surface in the captured image; and
   select the smaller of the plurality of boundaries as the first visual boundary.

26. The image scanning apparatus of claim 20, wherein the controller is further adapted to:
   determine the shape of the first visual boundary in the captured image; and
   transform the shape of the first visual boundary into a circle in response to the shape of the first visual boundary determined as being an ellipse.

* * * * *